United States Patent [19]

Camilleri

[11] Patent Number: 4,462,578
[45] Date of Patent: Jul. 31, 1984

[54] SHOCK ABSORBERS

[75] Inventor: Thomas M. Camilleri, New York, N.Y.

[73] Assignee: Sycam Advanced Technology Corp., New York, N.Y.

[21] Appl. No.: 362,080

[22] Filed: Mar. 26, 1982

Related U.S. Application Data

[63] Continuation-in-part of Ser. No. 143,811, Apr. 23, 1980, abandoned.

[51] Int. Cl.³ .............................................. F16F 13/02
[52] U.S. Cl. ..................................... 267/9 C; 188/67; 188/129; 188/381
[58] Field of Search ........................ 188/67, 129, 381; 267/8 R, 9 R, 9 C; 74/531; 213/36, 39

[56] References Cited

U.S. PATENT DOCUMENTS

| | | | |
|---|---|---|---|
| 1,037,052 | 8/1912 | Rennie | 188/289 |
| 1,070,114 | 8/1913 | Carson | 267/9 C |
| 1,153,531 | 9/1915 | Adams | 188/129 X |
| 1,195,028 | 8/1916 | Joyce | 188/289 |
| 1,301,809 | 4/1919 | Brooks et al. | 213/36 |
| 1,783,348 | 12/1930 | Taylor | 188/276 |
| 1,882,838 | 10/1932 | Haseltine | 213/36 |
| 2,453,966 | 11/1948 | Brown et al. | 188/289 |
| 2,940,552 | 6/1960 | Freyler | 188/129 |
| 2,992,815 | 7/1961 | Ellis, Jr. | 267/8 R |
| 3,145,012 | 8/1964 | Kfoury | 267/9 C X |
| 3,856,285 | 12/1974 | Yamada | 267/9 C |

FOREIGN PATENT DOCUMENTS

| | | | |
|---|---|---|---|
| 1214947 | 4/1966 | Fed. Rep. of Germany | 188/129 |
| 7402564 | 8/1975 | Netherlands . | |

Primary Examiner—George E. A. Halvosa

[57] ABSTRACT

A shock absorber for a vehicle is provided with an elongated rod which is longitudinally displaceable with respect to a carrier which supports at least one frictional rod engagement member for producing a rod travel retardation force. The rod engagement member is arranged to apply a lateral force to the rod, which lateral force is translated into the rod travel retardation force to smoothly and quickly control the motion of the rod between first and second positions. The frictional rod engagement member can be urged against a rod in various ways, including compression of a resilient or elastic force exerting component, such as a wire-wound spring. The combination of the force exerting components and the frictional member can be configured to apply retardation forces to the rod which have preselectable damping characteristics. In a featured embodiment of the invention, the resilient force exerting component is itself damped by contact with the frictional rod engagement member.

16 Claims, 9 Drawing Figures

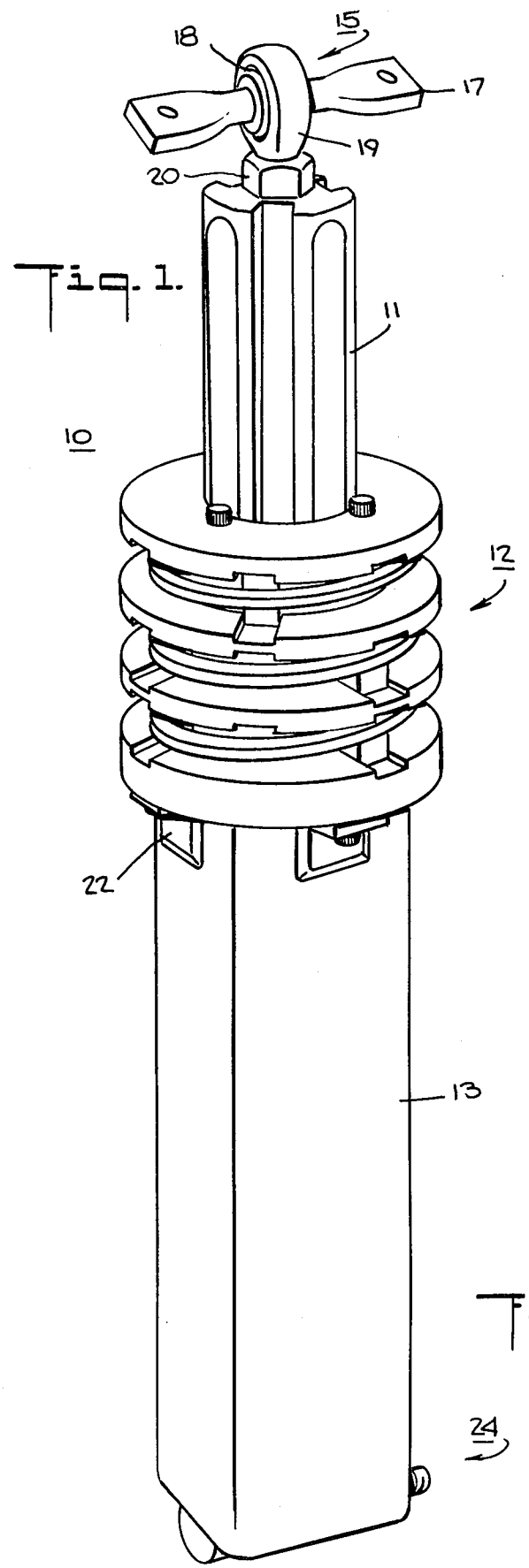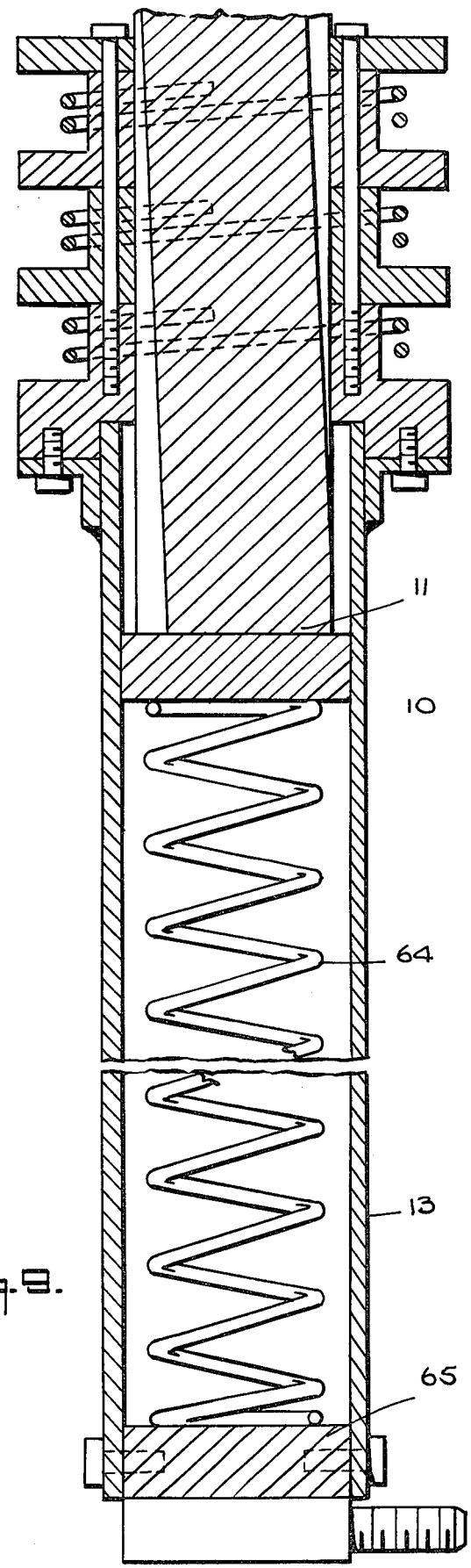

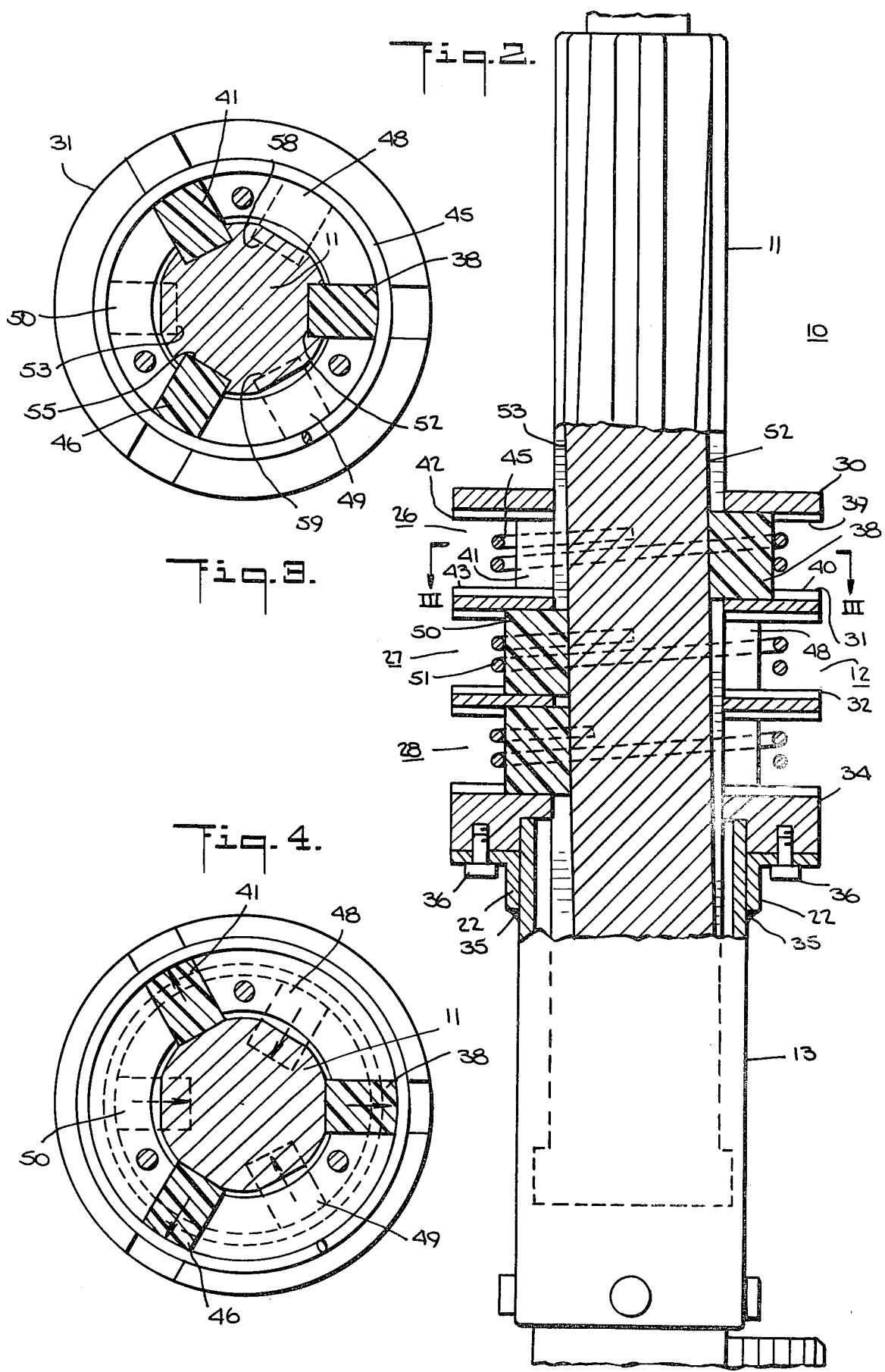

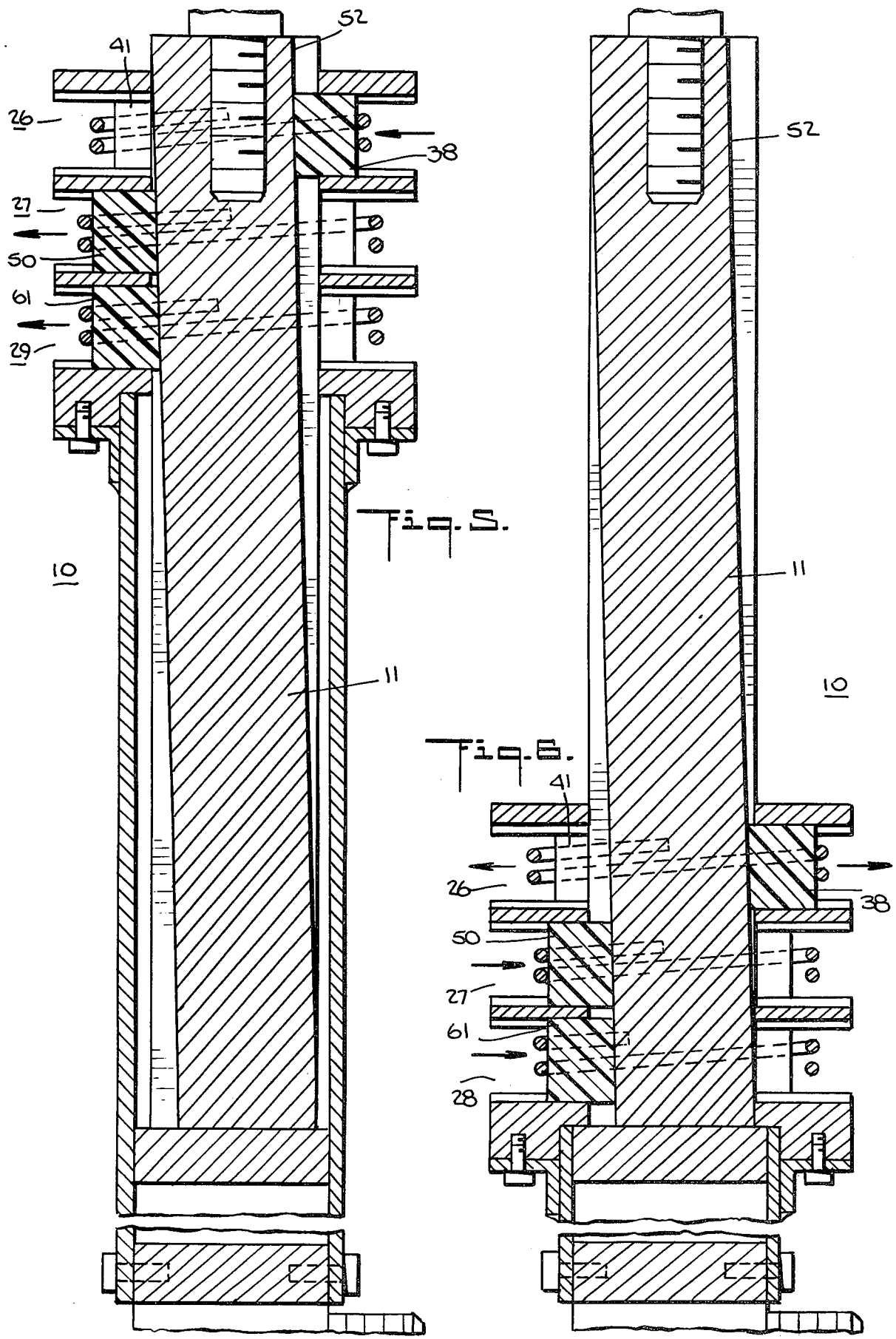

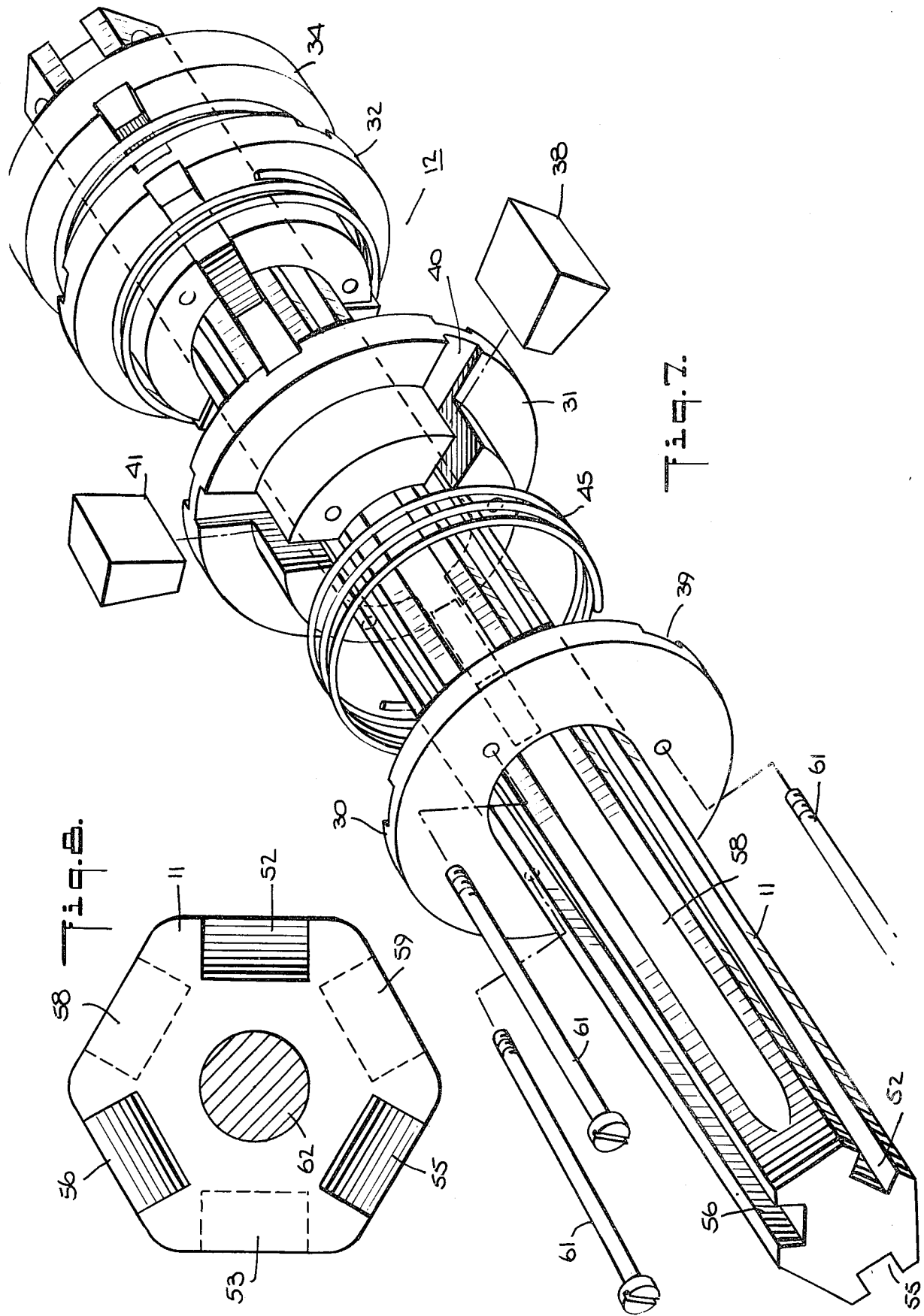

SHOCK ABSORBERS

RELATIONSHIP TO OTHER APPLICATIONS

This application is a continuation-in-part of my copending patent application Ser. No. 143,811, filed Apr. 23, 1980, now abandoned.

BACKGROUND OF THE INVENTION

This invention relates generally to motion dampening devices, and more particularly, to a friction shock absorber which is adaptable for use in a vehicle.

Shock absorbers are employed in many ways for damping movements of structures, vehicles, and machinery. Commonly, they have been used in conjunction with separately structured and housed suspension spring members and serve to damp or reduce oscillation of the spring members following the absorption of impact loading by the springs. This allows for return of the spring member to a normal rest position in a relatively smooth fashion. In many applications and in almost all vehicles, e.g., automobiles, aircraft, and the like, shock absorbers are of the well known hydraulic type which effect damping by controlling hydraulic fluid flow within the shock absorber unit through one or more orifices of restricted size. Hydraulic shock absorbers have several disadvantages. For one thing, they are generally only capable of functioning to provide a damping effect of preset magnitude dependent upon a fixed oil transfer orifice size. Secondly, hydraulic units are susceptible to instant failure if a leak occurs therein, a condition which can have very serious consequences when occurring in a vehicle moving at high speeds, including possible loss of control of the vehicle.

It is, therefore, an object of this invention to provide a shock absorber arrangement for a vehicle, the shock absorber arrangement being of the type which achieves damping by the application of friction forces in directions which resist motion of the components of the shock with respect to one another.

It is a further object of this invention to provide an improved shock absorber arrangement wherein the need for a fluid shock absorbing medium is obviated.

It is a still further object of the invention to provide a friction shock system of the type having mutually reciprocating members, the members having advantageously preselectable damping characteristics with respect to their relative motion in respective directions of travel.

SUMMARY OF THE INVENTION

The foregoing and other objects are achieved by this invention which provides a shock absorber arrangement which applies retardation forces in directions opposing the mechanical motion of first and second mechanical members. The mechanical members to which the various movable components of the shock absorber arrangement are mechanically connected move with respect to one another along respective predetermined paths. In one embodiment, the shock absorber arrangement is provided with an elongated rod member which has a longitudinal central axis. The elongated rod member is mechanically engaged with a carrier, the carrier and longitudinal rod member moving with respect to one another in directions which are substantially parallel to the longitudinal central axis of the elongated rod member. The elongated rod member is provided with at least first and second frictional surfaces which are displaced from the longitudinal central axis by respective displacement distances. Each of the displacement distances varies from the longitudinal central axis in accordance with a predetermined displacement function which correlates distance along the longitudinal central axis with the respective displacement distance between a particular one of the frictional surfaces and the longitudinal central axis.

The carrier supports a plurality of frictional members which frictionally engage the elongated rod member at its frictional surfaces as it reciprocates within the carrier. The frictonal members are urged against the frictional surfaces of the elongated rod member by at least one resilient device. The reciprocating motion of the elongated rod member with the carrier is retarded by the frictional forces produced by the frictional engagement and causes the frictional members to be displaced radially inward or outward, as the case may be, in accordance with the predetermined displacement function of the associated frictional surface.

In one embodiment of the invention, the radially outward motion of the frictional member in response to the substantially axial motion of the elongated rod member reduces a corresponding compression and relaxation of the resilient device. Thus, when the motion of the elongated rod member is in an inward direction with respect to the carrier, the frictional force applied by at least one of the frictional members increases as a result of the increased compression of the resilient device. In such an embodiment, a further resilient device may be provided to urge a further frictional member exerting a diminishing frictional force in opposition to the motion of the elongated rod member. It thus becomes clear that irrespective of whether the frictional force which is applied by the frictional members against the motion of the frictional surfaces of the elongated rod member is an increasing or diminishing force, a frictional force which opposes the reciprocating motion is always present to achieve a dampening effect. The predetermined displacement functions of the frictional surfaces of the elongated rod member, and the spring characteristics of the resilient devices, are advantageously preselectable to achieve a desired damping characteristic of the shock absorber arrangement.

In a further embodiment of the invention, the resilient devices, which store and release potential energy during reciprocation of the elongated rod member, are themselves damped to further enhance the overall damping characteristic of the shock absorber arrangement. In a particularly advantageous embodiment, the resilient devices assume the form of wound spring material which is concentrically arranged about the carrier and which is itself in sliding frictional engagement with the frictional members. In this manner, as the frictional members move radially inward and outward, the resilient devices move circumferentially in sliding frictional contact with the frictional members, at respective end faces which are distal from the end faces of the frictional members which engage the frictional surfaces of the elongated rod member. It is therefore a feature of this invention that a superior overall damping effect is achieved by the combination of two damped systems, specifically the frictional engagements between the frictional members, and the frictional surfaces and resilient devices, respectively. The frictional members may, in certain embodiments, be formed of a suitable polymeric material, such as, Nylon, or preferably Delryn-AF.

In a still further advantageous embodiment of the invention, strong impact loads which tend to drive the elongated rod member into the carrier are at least partially offset by providing a further resilient compression device, which may be a helical compression spring, in longitudinally axial alignment with the elongated rod member. Of course, the spring characteristic of the helical compression spring may be advantageously configured by the appropriate selection of spring wire diameter, coil spacing, and overall spring length. In addition, more than one such spring may be provided in a concentric arrangement.

BRIEF DESCRIPTION OF THE DRAWINGS

Comprehension of the invention is facilitated by reading the following detailed description in conjunction with the annexed drawings, in which:

FIG. 1 is a perspective plan view of a shock absorber arrangement constructed in accordance with the principles of the invention;

FIG. 2 is a partially fragmented lateral plan view of the embodiment of FIG. 1, showing the inner detail of the carrier arrangement;

FIG. 3 is a cross-sectional view taken along cross-section plane III—III of FIG. 2;

FIG. 4 is a cross-sectional end view of the invention taken along cross-section plane III—III of FIG. 2, but with the elongated rod member drawn further outward, in a direction toward the reader, than the situation of FIG. 3;

FIGS. 5 and 6 are cross-sectional lateral plan views of an embodiment of the invention showing the position of the frictional members while the elongated rod member is in withdrawn and extended positions, respectively;

FIG. 7 is an exploded perspective view of one embodiment of the invention;

FIG. 8 is an enlarged cross-sectional end view of the elongated rod member; and

FIG. 9 is a cross-sectional lateral plan view of the carrier of the shock absorber arrangement showing a helical coil spring adapted for absorbing impact loads.

DETAILED DESCRIPTION

FIG. 1 is a perspective plan view of a shock absorber arrangement which is generally designated 10 and constructed in accordance with the principles of the invention. Shock absorber 10 is generally formed of an elongated rod member 11 and a carrier assembly 12. In this specific illustrative embodiment, a casing 13 is provided for protecting elongated rod member 11 from damage while it is mounted in a vehicle (not shown). Elongated rod member 11 is provided at one end with a mounting assembly 15 which is comprised of a mounting arm 17 which is provided with a spherical portion 18. Spherical portion 18 is pivotally engaged within a holding ring 19, the spherical portion and its associated holding ring forming a ball joint. The ring is mechanically affixed to the end portion of elongated rod member 11 by means of a threaded portion (not shown) which threadedly engages a threaded hole (not shown) at the end of the elongated rod member, and a nut 20. Mounting assembly 15 permits affixation of the elongated rod member of the shock absorber to the undercarriage of the vehicle (not shown).

In this embodiment, carrier assembly 12 and casing 13 are mechanically affixed to one another by a plurality of brackets 22, which may be secured by welds. Casing 13 is not directly related to the damping operation of shock absorber 10 except insofar as it prevents the deposition of dirt and water upon elongated rod member 11. The casing, however, supports a lower mounting assembly 24 which operates in a conventional manner to permit affixation of the casing and the carrier assembly to an axle (not shown) of a vehicle.

FIG. 2 is a plan view of shock absorber arrangement 10 which has been partially fragmented to more clearly show some of details of carrier assembly 12. In the specific illustrative embodiment, carrier assembly 12 is comprised of three levels of friction subassemblies 26, 27, and 28. The friction subassemblies are separated from one another by a plurality of carrier discs 30, 31, and 32. Friction subassembly 28 is adjacent to carrier base 34 which is mechanically affixed to casing 13 by means of brackets 22. As shown in FIG. 2, brackets 22 are connected to casing 13 by respective welds 35 and to carrier base 34 by respective screws 36.

Each of friction subassemblies 26, 27, and 28 is provided with a plurality of friction shoes which are interposed between the carrier discs, and urged against elongated rod member 11 by wire wound springs. With reference to friction subassembly 26, a friction shoe member 38 is engaged in radial slots 39 and 40 of carrier discs 30 and 31, respectively. In this embodiment, each friction subassembly is provided with three friction shoe members which are engaged in respective radial slots in the carrier discs. A further friction shoe member 41 is visible in the fragmented depiction of FIG. 2, and is engaged in radial slots 42 and 43 of carrier discs 30 and 31, respectively. All three of the friction shoe members (only two of which are visible in the figure) are surrounded by a resilient spring element 45 which urges the friction shoe members into contact with elongated rod member 11.

FIG. 3 is a cross-sectional end view of shock absorber arrangement 10 taken along cross-sectional plane III—III of FIG. 2. FIG. 3 shows resilient spring element 45 which is arranged concentrically around friction shoe members 38, 41, and a further friction shoe member 46 which is not visible in the fragmented depiction of FIG. 2. Resilient spring element 45, as shown in FIG. 3, urges the friction shoe members into contact with elongated rod member 11. FIG. 3 further shows, in phantom, friction shoe members 48, 49, and 50, which are associated with friction subassembly 27 in FIG. 2.

Referring once again to FIG. 2, elongated rod member 11 is seen to have a plurality of sloped friction surfaces extending along its length. A first sloped friction surface 52 is shown to extend along the length of elongated rod member 11 and be contacted by friction shoe member 38 of friction subassembly 26. Similarly, a second sloped friction surface 53 is contacted by friction shoe member 50 of friction subassembly 27. As can be seen in the drawing, sloped friction surfaces 52 and 53 appear parallel to one another, in this embodiment, but are not parallel to a central longitudinal axis (not shown) of the elongated rod member. It can seen, therefore, that as elongated rod member 11 is drawn axially outward from casing 13 and along carrier assembly 12, friction shoe member 38 is driven radially outward along radial slots 39 and 40. Conversely, friction shoe member 50 is moved radially inward by operation of resilient spring element 51.

It can be seen from FIG. 3 that, in this embodiment, elongated rod member 11 is provided with six sloped friction surfaces. Sloped friction surfaces 52 and 53, as noted, are engaged by friction shoe members 38 and 50, respectively. Friction shoe members 46 and 41 which, with friction shoe member 38, comprise all of the friction shoe members of friction subassembly 26, engage respective ones of sloped friction surfaces 55 and 56 which exhibit slopes with respect to the central longitudinal axis of elongated rod member 11 which is similar to that of sloped friction surface 52. A further pair of sloped friction surfaces 58 and 59 are contacted by friction shoe members 48 and 49, respectively, and have slopes which are similar to that of sloped friction surface 53. Thus, in this embodiment, all of the friction shoe members in a given friction subassembly engage similarly sloped ones of the sloped friction surfaces.

The effect of axial motion of the elongated rod member upon the friction shoe members is shown in FIG. 4, which is a cross-sectional view taken along line III—III of FIG. 2. Elongated rod member 11 in FIG. 4 is drawn further outwardly from casing 13, than the position shown in FIG. 3. Such an outward extension causes friction shoe members 38, 41, and 46, which are associated with friction subassembly 26 of FIG. 2, to be moved outwardly. Conversely, friction shoe members 48, 49, and 50 are permitted to move radially inward, as shown by the arrows. This operation can be seen from FIG. 2 wherein it is shown that the upward motion of elongated rod member 11 with respect to carrier assembly 12 would cause shoe member 38 to be moved radially outward (to the right in the drawing). Conversely, friction shoe member 50 is urged radially inward as elongated rod member 11 is moved axially outward.

FIGS. 5 and 6 show shock absorber arrangement 10 with elongated rod member 11 in retracted and extended positions, respectively. As shown in FIG. 5, the retraction of elongated rod member 11 causes friction shoe member 38, which slides on sloped friction surface 52, to be drawn radially inward, as indicated by the arrow. The axially outward extension of elongated rod member 11, as shown in FIG. 6, causes friction shoe member 38 to be moved radially outward. In the specific illustrative embodiment wherein three friction subassemblies, 26, 27, and 28 are provided, the friction shoe members of friction subassembly 26 operate in a direction opposite to those of friction subassemblies 27 and 28. Thus, as shown in FIGS. 5 and 6, friction shoe members 41 and 38 operate in opposite radial directions from shoes 50 and 61.

FIG. 7 is an exploded perspective view of carrier assembly 12 and showing the relative position of elongated rod member 11. This exploded diagram clearly shows the manner in which friction shoe member 38 is engaged in radial slots 39 and 40 of carrier discs 30 and 31, respectively. Carrier assembly 12 is held together by threaded screws 61 which are arranged to pass through holes which are bored through carrier discs 30, 31, and 32, and be threadedly engaged with internally threaded holes (not shown) in carrier base 34.

FIG. 8 is an enlarged cross-sectional end view of elongated rod member 11 showing an axial hole 62 for facilitating the affixation of mounting assembly 15. This cross-sectional end view of elongated rod member 11 clearly shows sloped friction surfaces 52, 55, and 56, which taper inwardly out of the plane of the paper, and, in phantom, frictional surfaces 53, 58, and 59 which taper radially outward out of the plane of the paper.

FIG. 9 is a cross-sectional representation of shock absorber 10 showing particularly a helical compression spring 64 which is interposed within casing 13 and between elongated rod member 11 and a bottom portion 65 for the casing. Helical compression spring 64 is intended to absorb large impact loads which tend to retract elongated rod member 11 into casing 13. Of course, the diameter of the spring wire which forms helical compression spring 64, its length, radius, and its intercoil spacing can all be advantageously preselected to achieve a desired compression characteristic. Moreover, other types of springs may be inserted within helical compression spring 64 to achieve a desired spring characteristic.

Although the invention has been described in terms of a specific embodiment for specific applications, it is to be understood that persons skilled in the pertinent art can, in light of this teaching, produce additional embodiments without departing from the spirit or exceeding the scope of the invention. Accordingly, it is to be understood that the drawings and description in this disclosure are proffered for the facilitating comprehension of the invention, and should not be construed to limit the scope thereof. For example, the shock absorber embodiments described in this disclosure can be adapted by persons skilled in the art to be utilized with any type of machinery which presently contains hydraulic shock absorbing equipment. Such machinery further includes railroad suspension and coupling arrangements, aircraft landing gear, ship docking facilities, tractors, and the like.

What is claimed is:

1. A vehicle shock absorber for damping mechanical motion between vehicle body and axle members with respect to one another, the vehicle body and axle members moving along respective predetermined paths with respect to each other, the shock absorber being of the type wherein frictional retardation forces are produced in directions opposing the mechanical motion between the vehicle body and axle members, the shock absorber further comprising:

elongated rod member means having a longitudinal axis, said elongated rod member means further having a plurality of continuously sloping frictional surfaces, each arranged in a corresponding one of at least first and second inversely tapering groups of said sloping frictional surfaces, said frictional surfaces extending continuously substantially coextensively with one another along said longitudinal axis, and coextensive with a maximum excursion of said elongated rod member means, each of said sloping frictional surfaces being displaced from said longitudinal axis by a respective displacement distance which varies in accordance with a selectable one of at least first and second predetermined displacement functions for correlating distances along said longitudinal axis with said respective displacement distance throughout said longitudinal coextension with remaining ones of said sloping frictional surfaces in said corresponding group of said sloping frictional surfaces;

at least first and second groups of frictional members, each of said groups of frictional members being adapted to apply a corresponding one of the frictional retardation forces to a respectively associated one of said first and second groups of said sloping frictional surfaces, each of said frictional members having a length along said longitudinal axis which is substantially shorter than said longitudinal coextension of said sloping frictional surfaces and maintaining a substantially constant frictional engagement area with said elongated rod member means throughout said longitudinal coextension as said elongated rod member means moves with respect to said frictional members;

first and second resilient means for frictionally communicating with and urging respective ones of said first and second groups of frictional members against said respectively associated first and second groups of sloping frictional surfaces of said elongated rod member means, said frictional communication including a sliding engagement between said resilient means and each of said frictional members having at least one sliding contact area and being frictionally damped; and carrier means for supporting said first and second groups of frictional members substantially orthogonal to said longitudinal axis of said elongated rod member means, and in communication with said first and second groups of said sloping frictional surfaces, respectively, whereby longitudinally axial motion of said elongated rod member means in a first direction with respect to said carrier means causes predetermined ones of said resilient means to urge said first group of frictional members against said first group of sloping frictional surfaces to increase progressively one of the frictional retardation forces, and whereby longitudinally axial motion of said elongated rod member means in a second direction which is axially opposite to said first direction causes predetermined others of said resilient means to urge said second group of frictional members against said second group of sloping frictional surfaces to increase progressively a further one of the frictional retardation forces.

2. The vehicle shock absorber of claim 1 wherein said first and second predetermined displacement functions which correlate said distances along said longitudinal axis with said respective displacement distances are linear functions, whereby said respective displacement distances vary linearly with respect to distances along said longitudinal axis.

3. The vehicle shock absorber of claim 1 wherein said resilient means each comprise a spring.

4. The vehicle shock absorber of claim 3 wherein said sloping frictional surfaces of said elongated rod member means are smooth, and frictional members of said first and second group frictional members are each formed of a polymeric material.

5. The vehicle shock absorber of claim 1 wherein there is further provided casing means mechanically affixed to said carrier means for protecting said elongated rod member.

6. The vehicle shock absorber of claim 5 wherein there is further provided resilient impact means for providing a force in opposition to an impact load which tends to retract said elongated member means past said carrier means and into said casing means.

7. A shock absorber comprising:

a rod member having a predetermined length along a longitudinal axis and frictional surfaces, said frictional surfaces extending continuously longitudinally along said rod member and being inversely tapering and substantially coextensive with one another and with said predetermined length of said rod member;

a casing which supports and substantially surrounds said rod member and permits movement of said rod member between first and second longitudinal positions with respect to said casing;

engagement means coupled to said casing for applying frictional resistance forces in opposition to said movement, said engagement means including damped resilient means and at least first and second frictional members, said damped resilient means being in sliding frictional engagement with said at least first and second frictional members at a plurality of contact areas and urging dampedly said at least first and second frictional members into continuous lateral engagement with respective ones of said frictional surfaces of said rod member whereby at least said first frictional member is adapted to apply increasing resistance force against movement of said rod member from said first position to said second position and decreasing resistance force against movement of said rod from said second position to said first position, and at least said second frictional member being adapted to apply increasing resistance force against movement of said rod member from said second position to said first position and decreasing resistance force against movement of said rod from said first position to said second position.

8. The shock absorber of claim 7 wherein said frictional surfaces of said rod member provide at least first and second tapered frictional surfaces, said first and second frictional members abutting with and being laterally disposed to respective ones of said first and second tapered frictional surfaces.

9. The shock absorber of claim 8 wherein said first and second frictional members abut said rod member at respective points on said first and second tapered surfaces, said respective points corresponding to a substantially common point along the longitudinal axis of said rod member.

10. The shock absorber of claim 9 wherein said first and second frictional members are each biased toward their respectively abutting ones of said first and second tapered surfaces by a respective one of first and second springs.

11. An apparatus for damping mechanical motion of first and second mechanical members with respect to one another, the first and second mechanical members moving along respective predetermined paths, the apparatus being of the type wherein retardation forces are produced in directions opposing the mechanical motion of the first and second mechanical members, the apparatus comprising:

elongated rod member means having a central longitiudinal axis, said elongated rod member means further having first and second frictional surfaces having portions thereof extending concurrently along a predetermined length along said central longitudinal axis in a direction substantially parallel with that of said central longitudinal axis, said first and second frictional surfaces being continuously orthogonally displaced from said central longitudinal axis by respective first and second displacement distances which vary in accordance with respective first and second predetermined continuous displacement functions which correlate distance along said central longitudinal axis with said respective displacement distances whereby said first and second frictional surfaces taper inversely with respect to one another and said central longitudinal axis and are coextensive with one another and with said predetermined length;

first and second frictional members, each for applying a corresponding one of first and second frictional forces against a respectively associated one of said first and second frictional surfaces;

first and second resilient means for simultaneously urging said first and second frictional members, respectively, against said respectively associated first and second frictional surfaces of said elongated rod member means;

carrier means for movably supporting said first and second frictional members substantially orthogonal to said central longitudinal axis of said elongated rod member means, and in communication with said first and second frictional surfaces, respectively, said communication with said first and second frictional surfaces occurring at respective corresponding points on said central longitudinal axis, whereby longitudinally axial motion of said elongated rod member means in a first direction with respect to said carrier means causes said first resilient means to urge said first frictional member against said first frictional surface with a progressively increasing first lateral force so as to increase progressively said corresponding first frictional force, and whereby longitudinally axial motion of said elongated rod member means in a second direction which is axially opposite to said first direction causes said second resilient means to urge said second frictional member against said second frictional surface with a progressively increasing second lateral force so as to increase progressively said corresponding second frictional force, motion between said first and second frictional members and said carrier means being damped by sliding frictional engagement between said first and second frictional members and said first and second resilient means at a plurality of contact areas, respectively;

first coupling means for mechanically affixing said elongated rod member means to the first mechanical member; and second coupling means for mechanically affixing said carrier means to the second mechanical member.

12. The apparatus of claim 11 wherein said first and second predetermined displacement functions which correlate said distances along said central longitudinal axis with said first and second displacement distances, respectively, are linear functions, whereby said first and second displacement distances vary linearly with respect to distances along said central longitudinal axis.

13. The apparatus of claim 11 wherein said first and second resilient means each comprise at least one expansion spring.

14. The apparatus of claim 11 wherein said first and second frictional surfaces of said elongated rod member means are smooth, and said first and second frictional members each have a contact surface having a predetermined configuration for engaging a respective associated one of said first and second frictional surfaces.

15. The apparatus of claim 11 wherein there are further provided resilient impact means for providing a force in opposition to an impact load applied to the apparatus.

16. The apparatus of claim 15 wherein said resilient impact means comprises at least one compression spring.

* * * * *